(12) United States Patent  (10) Patent No.: US 8,063,888 B2
McFarlane et al.  (45) Date of Patent: Nov. 22, 2011

(54) IDENTIFICATION OF DEVICES ON TOUCH-SENSITIVE SURFACE

(75) Inventors: Craig McFarlane, Kirkland, WA (US);
Dana L. Silverstein, Duvall, WA (US);
Victor Drake, Clyde Hill, WA (US);
Kevin Kennedy, Kirkland, WA (US);
Cyra Richardson, Bellevue, WA (US);
Nigel Keam, Redmond, WA (US); Neal Bangerter, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 11/708,400

(22) Filed: Feb. 20, 2007

(65) Prior Publication Data

US 2008/0198138 A1  Aug. 21, 2008

(51) Int. Cl.
*G06F 3/041* (2006.01)

(52) U.S. Cl. ........ 345/173; 345/156; 345/175; 235/494; 235/454; 717/174; 717/176; 455/426.1; 178/18.09; 178/18.01

(58) Field of Classification Search .................. 345/175, 345/173; 235/494, 454; 717/174, 176; 455/426.1; 178/18.09, 18.01
See application file for complete search history.

(56) References Cited

U.S. PATENT DOCUMENTS

| | | | |
|---|---|---|---|
| 5,461,385 A | 10/1995 | Armstrong | |
| 6,501,463 B1 * | 12/2002 | Dahley et al. | 345/173 |
| 7,034,660 B2 | 4/2006 | Watters et al. | |
| 7,058,362 B1 | 6/2006 | Khorrami et al. | |
| 7,570,249 B2 * | 8/2009 | Han et al. | 345/166 |
| 2004/0036623 A1 | 2/2004 | Chung | |
| 2004/0135684 A1 * | 7/2004 | Steinthal et al. | 340/522 |
| 2005/0219204 A1 * | 10/2005 | Huddleston et al. | 345/156 |
| 2005/0246094 A1 | 11/2005 | Moscatiello | |
| 2005/0251800 A1 * | 11/2005 | Kurlander et al. | 717/174 |
| 2006/0038684 A1 | 2/2006 | Lahiri | |
| 2006/0064718 A1 * | 3/2006 | Fuchikami et al. | 725/38 |
| 2006/0128408 A1 * | 6/2006 | Perttila et al. | 455/466 |
| 2006/0139314 A1 * | 6/2006 | Bell | 345/156 |
| 2006/0170565 A1 | 8/2006 | Husak et al. | |
| 2006/0178816 A1 | 8/2006 | Dickin et al. | |

(Continued)

FOREIGN PATENT DOCUMENTS

WO  WO2005122625 A1  12/2005

OTHER PUBLICATIONS

Ferscha et al., "Location Awareness in Community Wireless LANs", http://www.soft.uni-linz.ac.at/Research/Publications/_Documents/informatik2001.pdf.

(Continued)

*Primary Examiner* — Lun-Yi Lao
*Assistant Examiner* — Priyank Shah
(74) *Attorney, Agent, or Firm* — Alleman Hall McCoy Russell & Tuttle LLP

(57) ABSTRACT

The identification of a data storage device detected on a touch-sensitive display surface of a display device is described. In one embodiment, the presence and location of the data storage device is detected on the display surface and the data storage device is detected on a wireless communications channel. It is then confirmed that the data storage device detected on the wireless communications channel is the data storage device detected on the surface of the display device by communicating with the data storage device over a second communications channel.

16 Claims, 9 Drawing Sheets

U.S. PATENT DOCUMENTS

| | | | |
|---|---|---|---|
| 2006/0202862 A1 | 9/2006 | Ratnakar | |
| 2006/0227099 A1* | 10/2006 | Han et al. | 345/156 |
| 2006/0230192 A1* | 10/2006 | Parry et al. | 710/15 |
| 2006/0244593 A1 | 11/2006 | Nycz et al. | |
| 2006/0249577 A1* | 11/2006 | Silverbrook et al. | 235/383 |
| 2006/0250253 A1 | 11/2006 | Liu | |
| 2006/0252374 A1 | 11/2006 | Ban et al. | |
| 2007/0022369 A1* | 1/2007 | Han et al. | 715/508 |
| 2008/0089090 A1* | 4/2008 | Bathiche et al. | 362/600 |
| 2008/0251584 A1* | 10/2008 | Keam | 235/454 |
| 2009/0173796 A1* | 7/2009 | Keam | 235/494 |

OTHER PUBLICATIONS

Morikawa et al., "Mobile Web Publishing and Surfing Based on Environmental Sensing Data", Date: May 2006, http://www2006.org/programme/files/pdf/p224.pdf.

Willis et al., "A Passive RFID Information Grid for Location and ProximitySensing for the Blind User", http://www.cise.ufl.edu/tech_reports/tr04/tr04-009.pdf, Jan. 2004.

Jun Rekimoto, et al.,"Proximal Interactions: A Direct Manipulation Technique for Wireless networking"http://www.sony.co.jp/person/rekimoto.html, Sep. 2003.

* cited by examiner

ID ENTIFICATION OF DEVICES ON
TOUCH-SENSITIVE SURFACE

BACKGROUND

The sharing of photographic and other data stored on mobile data storage devices, such as cell phones, cameras, personal digital assistants, etc., currently poses various difficulties. For example, currently a mobile device user may share such data by first transferring the data to a computer and then sharing the data by email, by uploading to a network server, etc. However, such sharing processes may take many user steps, and may be difficult to perform while a user is away from a home computer, for example, when on vacation, while at a restaurant, etc. Therefore, in these settings, photos are often shared by passing the mobile data storage device from person to person to view the photos on the device display. Due to the small size of such displays, it may be difficult for more than one or two people to simultaneously view a photograph.

Some mobile devices, such as cellular phones, may be equipped to send photographs and other such data to other devices over a cellular network. However, per transaction costs may be high for sending such data. Additionally, each transaction may involve multiple user steps. Further, the generally small sizes of mobile device displays may limit the number of persons who can view the data on the receiving device, and therefore may reduce user satisfaction with the sharing experience.

Likewise, some mobile data storage devices equipped with wireless communications technologies such as Bluetooth (IEEE 802.15.1) and WiFi (IEEE 802.11x) may be configured to allow the sharing of data with other similarly-equipped devices. However, sharing content via such technology also may involve many user steps to connect to and transfer content between devices. Eliminating steps to improve the user experience may pose problems where more than one data storage device is detected within communication range, as it may be difficult for each device to identify which device of the detected devices data is to be transferred to or from without user input steps.

SUMMARY

Accordingly, the automatic identification of a data storage device by a touch-sensitive interactive display device, to which data in the data storage device may be transferred for display to a plurality of users, is described below in the Detailed Description. For example, in one embodiment, a data storage device detected on a touch-sensitive surface of a display device is identified by detecting the data storage device on a wireless communications channel, and then confirming that the data storage device detected on the wireless communications channel is the data storage device detected on the surface of the display device by communicating with the data storage device over a second communications channel. This may allow the display device to identify the data storage device from among multiple data storage devices detected on the wireless communications channel, and thereby to receive data only from the identified data storage device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
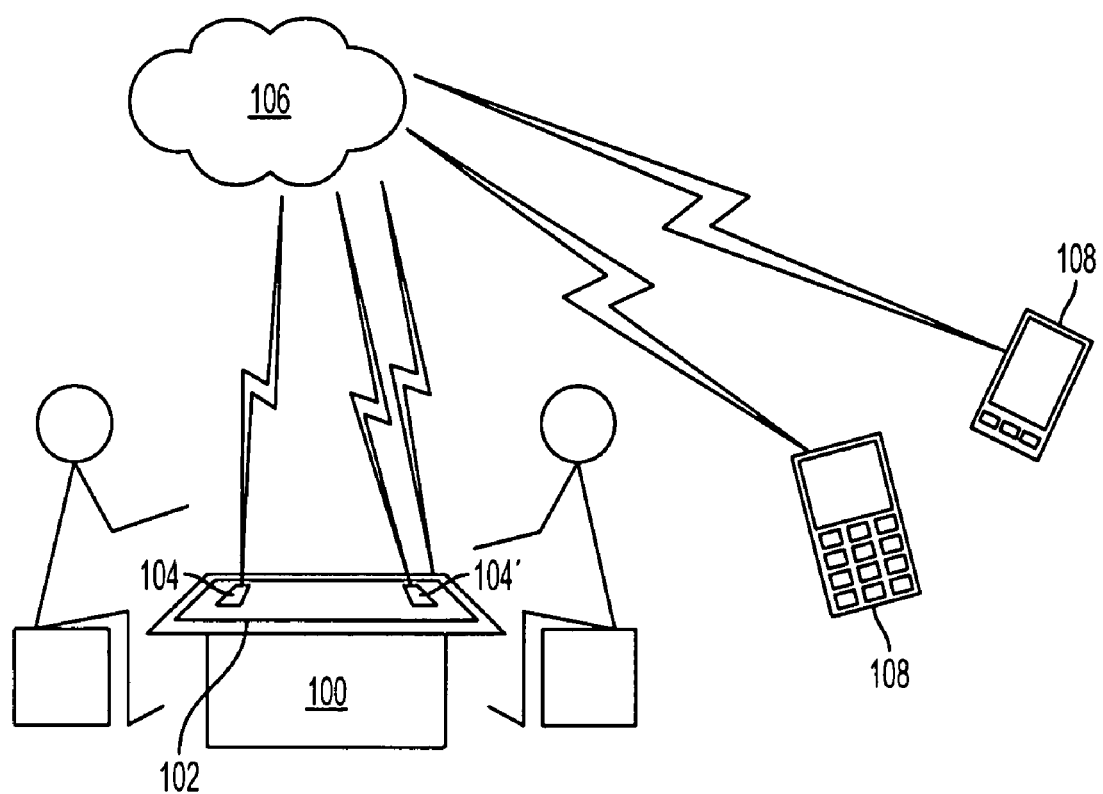
FIG. 1 shows an embodiment of an interactive display device according to the present disclosure.

FIG. 1 shows an embodiment of an interactive display device 100 configured to receive data from a mobile data storage device and to display the data to a plurality of users. Data that may be shared via interactive display device 100 may include, but is not limited to, photographic data, video data, music and other audio data, graphical data, documents, spreadsheets, presentations, and any other suitable type of data. Interactive display device 100 may also be configured to allow various operations to be performed on displayed data, including but not limited to editing, sending via email, uploading to other mobile data storage devices, printing, ordering printed copies over a network, etc.

Interactive display device 100 may be configured to receive data from and/or to transfer data to any suitable type of mobile data storage device. Examples of such mobile data storage devices include, but are not limited to, mobile computing devices such as laptop computers, hand-held devices, cellular phones, portable media players, personal digital assistants, cameras, video cameras, and other microprocessor-based or microcontroller-based programmable consumer electronics and/or appliances. As used herein, the term "computing device" may include any device that electronically executes one or more programs, and "data storage device" may include any device with a computer-readable storage medium capable of storing computer-readable data and/or other content. The embodiments described herein may be implemented on such devices, for example, via computer-executable instructions or code, such as programs, stored on a computer-readable storage medium and executed by the computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Interactive display device 100 may also be configured to receive data from devices other than computing devices, including but not limited to data storage devices such as flash drives, etc. having communications capabilities.

Turning again to FIG. 1, the depicted interactive display device 100 comprises a horizontal table-like top surface having a touch-sensitive display screen 102. As described in more detail below, a user may transfer data to interactive display device 100 from a suitably enabled mobile data storage device 104 simply by placing mobile data storage device 104 on touch-sensitive display screen 102. Interactive display device 100 detects the presence and location of mobile data storage device 104 on touch-sensitive display screen 102, connects to mobile data storage device 104 via a wireless communications channel 106, receives data from mobile data storage device 104 over the wireless communications channel, and displays the data on touch-sensitive display screen 102. The data then may be viewed, and in some embodiments, manipulated, via touch-sensitive display screen 102 by a group of persons seated around interactive display device 100. In this manner, photographs and other data stored on mobile data storage device 104 may be shared by a group of users in a simple and intuitive manner. While described herein in the context of an interactive display device having a horizontal, table-like display surface, it will be appreciated that interactive display device 100 may include a display having any other suitable orientation, including but not limited to vertical and diagonal orientations.

At times, more than one mobile data storage device may be placed on touch-sensitive display screen 102, as shown in FIG. 1 at 104'. Likewise, at times, one or more mobile data storage devices 108 may be detected on wireless communications channel 106 but not located on touch-sensitive display screen 102. In order for interactive display device 100 to determine the identities of those data storage devices from which to receive data as well as the appropriate location and orientation on interactive display device 100 to display the data, interactive display device 100 may be configured to distinguish mobile data storage devices 104, 104' that are placed on touch-sensitive display screen 102 from devices 108 not placed on touch-sensitive display screen 102. Interactive display device 100 may also be configured to identify the specific locations on touch-sensitive display screen 102 at which each mobile data storage device 104, 104' is placed. This may allow interactive display device 100 to display data received from each device 104, 104' in a location associated with the transfer or device, and also not to download and/or display data from devices 108 that are detected on wireless communication channel 106 but not placed on touch-sensitive surface 102.

Figure 2:
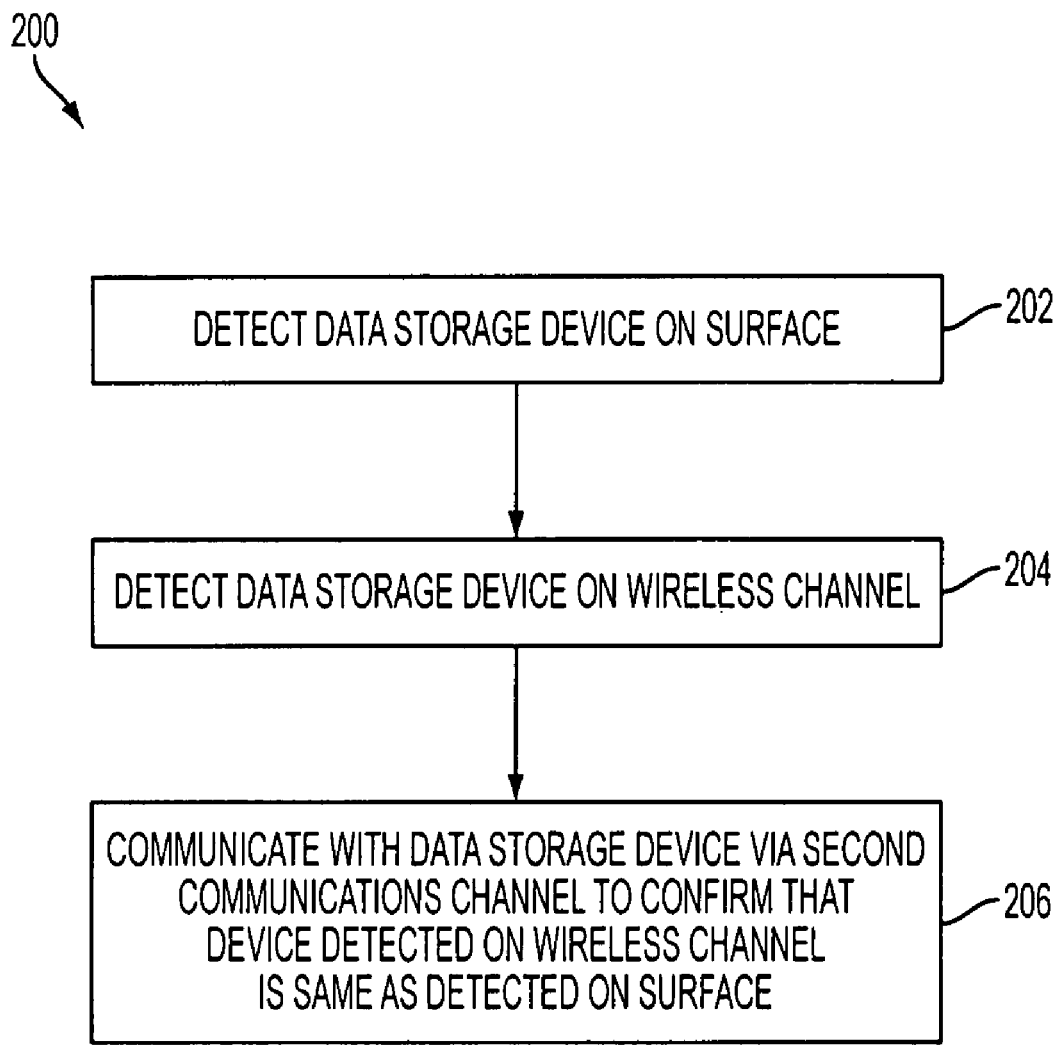
FIG. 2 shows a process flow of an embodiment of a method for identifying a data storage device placed on the surface of an interactive display device.

FIG. 2 shows a process flow depicting an embodiment of a method 200 for identifying one or more data storage device(s) 104 placed on touch-sensitive display screen 102. Method 200 first includes detecting, at 202, a presence and location of a mobile data storage device 104 on touch-sensitive display screen 102, and detecting, at 204, the mobile data storage device 104 on a wireless communications channel 106. In some embodiments, mobile data storage device 104 may be detected on the wireless network before being placed on touch-sensitive display screen. In other embodiments, interactive display device 100 may be configured to detect devices on wireless network 106 only when an object is detected on touch-sensitive display screen 102.

Next, method 200 includes confirming, at 206, that the mobile data storage device 104 detected on the wireless communications channel 106 is the data storage device 104 detected on the surface of the display device by communicating with the data storage device over a second communications channel. Once interactive display device 100 has confirmed that the data storage device detected on the wireless communications channel is the data storage device 104 detected on the touch-sensitive display, data may be transferred from mobile data storage device 104 to the interactive display device 100 for display on display surface 102.

The presence and location of mobile data storage device 104 on the touch-sensitive display may be determined in any suitable manner. For example, in some embodiments, touch-sensitive display screen 102 may include an electrically sensitive touch sensitive mechanism (for example, a capacitive or resistive mechanism) capable of locating an object placed on touch-sensitive display screen 102. In other embodiments, interactive display device 100 may include an image capture device configured to capture an image of touch-sensitive display screen 102 to detect infrared or visible light reflected from objects placed on touch-sensitive display screen 102. In these embodiments, motion of an object on touch-sensitive screen 102 may be detected by capturing images of touch-sensitive display screen 102 at a suitably high sample rate, for example, between 20 and 100 Hz, to track object motion on screen 102. Various embodiments of interactive display device 100 are described in more detail below.

Likewise, the presence of mobile data storage device 104 on the wireless communications channel 106 may be detected in any suitable manner. For example, interactive display device 100 may send an intermittent and/or periodic beacon over wireless communications channel 106 to alert mobile data storage devices within range of its presence, and devices receiving the beacon may connect to interactive display device 100 in response to the beacon. Alternatively, interactive display device 100 may send a beacon over wireless communications channel 106 only when an object is detected on touch-sensitive surface 102. In either these embodiments, display 102 (as well as other electronic systems) may remain dormant until activity is detected by the wireless communications channel or the touch-screen interface. This may allow interactive display device 100 to assume a deeper power-save mode during periods of inactivity, such as during the night. It will be appreciated that interactive display device 100 may be configured to communicate with and receive data from mobile data storage device 104 via any suitable wireless communications technology. Examples include, but are not limited to, radiofrequency technologies such as 802.11x technologies, Bluetooth technologies, active or passive radiofrequency identification (RFID) technologies, etc.

Continuing with FIG. 2, interactive display device 100 may confirm at 206 the identification of the mobile data storage device 104 via communication with mobile data storage device 104 over any suitable second communications channel. Suitable channels include those channels that are sensitive to a position of mobile data storage device 104 on touch-sensitive display screen 102. Specific examples include, but are not limited to, optical and electromagnetic second communications channels such as the touch sensitive mechanism of touch-sensitive display screen 102. For example, where interactive display device 100 utilizes a capacitive, resistive, or other electrical touch-sensing mechanism, the electrical touch-sensing mechanism may be used to detect a modulated electrical signal emitted by mobile data storage device 104. Likewise, where interactive display device 100 utilizes an image capture device to implement the touch sensitivity of display surface 102 by detecting images of objects on display surface, the image capture device may also be used as a second communications channel to receive an optical communication signal from mobile data storage device 104.

Figure 3:
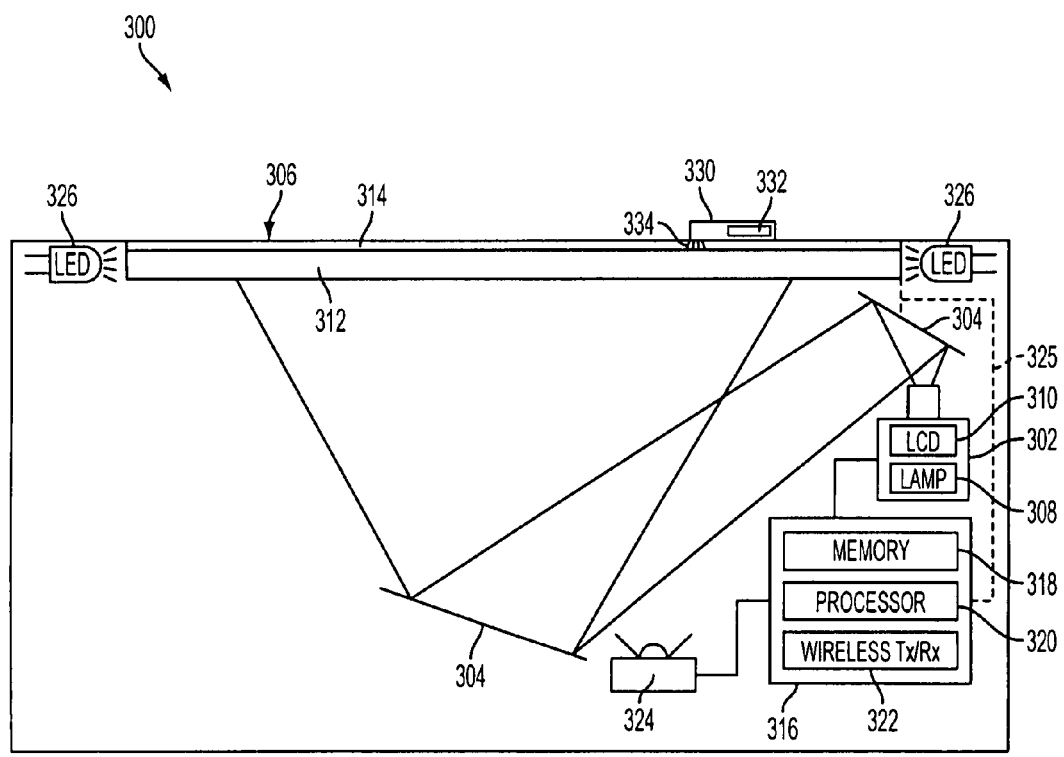
FIG. 3 shows a schematic diagram of another embodiment of an interactive display device.

FIG. 3 shows a schematic depiction of an embodiment of an interactive display device 300 utilizing an optical touch sensing mechanism. Interactive display device 300 comprises a projection display system having an image source 302, optionally one or more mirrors 304 for increasing an optical path length and image size of the projection display, and a display screen 306 onto which images are projected.

Image source 302 includes an optical or light source 308 such as the depicted lamp, an LED array, or other suitable light source. Image source 302 also includes an image-producing element 310 such as the depicted LCD (liquid crystal display), an LCOS (liquid crystal on silicon) display, a DLP (digital light processing) display, or any other suitable image-producing element. Display screen 306 includes a clear, transparent portion 312, such as sheet of glass, and a diffuser screen layer 314 disposed on top of the clear, transparent portion 312. In some embodiments, an additional transparent layer (not shown) may be disposed over diffuser screen layer 314 to provide a smooth look and feel to the display surface.

Continuing with FIG. 3, interactive display device 300 further includes an electronic controller 316 comprising memory 318 and a microprocessor 320. Further, controller 316 may include a wireless transmitter and receiver 322 configured to conduct two-way communication with mobile data storage devices. Wireless transmitter and receiver 322 may be configured to conduct wireless communications with mobile data storage device in any suitable manner, including but not limited to via 802.11x, Bluetooth, RFID or other radiofrequency communications technologies. While shown as part of controller 316, it will be appreciated that wireless transmitter and receiver 322 may also be provided as a separate device in electrical communication with controller 316.

To sense objects placed on display screen 306, interactive display device 300 includes an image capture device 324 configured to capture an image of the entire backside of display screen 306, and to provide the image to electronic controller 316 for the detection of objects appearing in the image. Diffuser screen layer 314 helps to avoid the imaging of objects that are not in contact with or positioned within a few millimeters of display screen 306, and therefore helps to ensure that only objects that are touching display screen 306 are detected by image capture device 324.

Image capture device 324 may include any suitable image sensing mechanism. Examples of suitable image sensing mechanisms include but are not limited to CCD and CMOS image sensors. Further, the image sensing mechanisms may capture images of display screen 306 at a sufficient frequency to detect motion of an object across display screen 306. Display screen 306 may alternatively or further include an optional capacitive, resistive or other electromagnetic touch-sensing mechanism, as illustrated by dashed-line connection 325 of screen 306 with controller 316.

Image capture device 324 may be configured to detect reflected or emitted energy of any suitable wavelength, including but not limited to infrared and visible wavelengths. To assist in detecting objects placed on display screen 306, image capture device 324 may further include an additional optical source or emitter such as one or more light emitting diodes (LEDs) 326 configured to produce infrared or visible light. Light from LEDs 326 may be reflected by objects placed on display screen 306 and then detected by image capture device 324. The use of infrared LEDs as opposed to visible LEDs may help to avoid washing out the appearance of projected images on display screen 306.

LEDs 326 may be positioned at any suitable location within interactive display device 300. In the depicted embodiment, a plurality of LEDs 326 are placed along a side of display screen 306. In this location, light from the LEDs can travel through display screen 306 via internal reflection, while some can escape from display screen 306 for reflection by an object on the display screen 306. In alternative embodiments, one or more LEDs may be placed beneath display screen 306 so as to pass emitted light through display screen 306.

FIG. 3 also depicts a mobile data storage device 330 that has been placed on display screen 306. Mobile data storage device 330 includes a wireless transmitter and receiver 332 configured to communicate with wireless transmitter and receiver 322 on interactive display device 300, and also includes an electrical and/or optical emitter 334 configured to emit an electrical and/or optical signal that is detectable by display screen 306 and/or image capture device 324. In alternative embodiments, mobile data storage device 330 comprises an optical detector, as described in more detail below.

Figure 4:
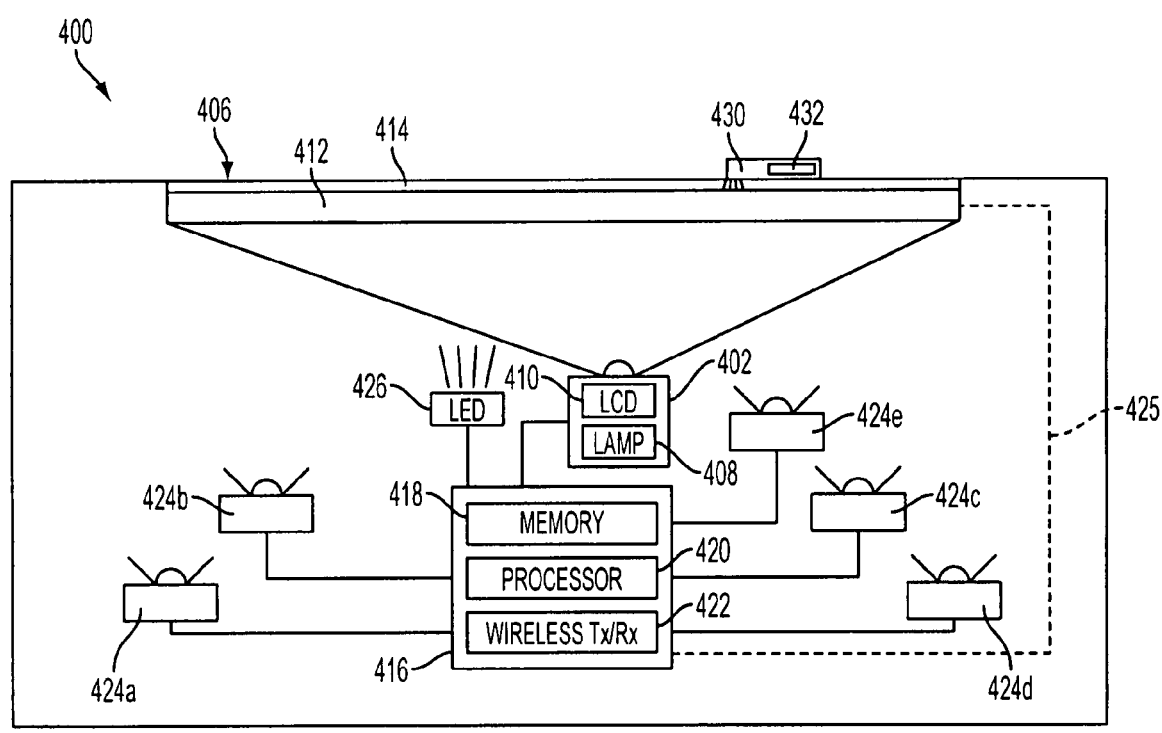
FIG. 4 shows a schematic diagram of yet another embodiment of an interactive display device.

FIG. 4 shows a schematic depiction of another embodiment of an interactive display device 400 that utilizes an optical touch sensing mechanism. Interactive display device 400 comprises a projection display system having a wide angle image source 402 and a display screen 406 onto which images are projected. Image source 402 includes a light source 408 and an image-producing element 410. Display screen 406 includes a transparent glass structure 412 and a diffuser screen layer 414 disposed thereon.

Continuing with FIG. 4, interactive display device 400 includes an electronic controller 416 comprising memory 418 and a microprocessor 420. Further, interactive display device 400 includes a wireless transmitter and receiver 422 configured to conduct two-way communication with mobile data storage devices, such as device 430 via wireless transmitter and receiver 432 on device 430.

Interactive display device further includes a plurality of image capture devices, depicted as 424a-424e, and an optical emitter such as an LED array 426 configured to illuminate a backside of display screen 406 with infrared or visible light. Image capture devices 424a-e are each configured to capture an image of a portion of display screen 406 and provide the image to controller 416, and to assemble a composite image of the entire display screen 406 from the images. In the depicted embodiment, image capture devices 424a-d are positioned generally beneath the corners of display screen 406, while image capture device 424e is positioned in a location such that it does not pick up glare from LED array 426 reflected by display screen 406 that may be picked up by image capture devices 424a-d. In this manner, images from image capture devices 424a-e may be combined by controller 416 to produce a complete, glare-free image of the backside of display screen 406. This allows detection of an object such as a mobile data storage device 430 placed on display screen 406. Display screen 406 may alternatively or further include an optional capacitive, resistive or other electromagnetic touch-sensing mechanism, as illustrated by dashed-line connection 425 of screen 406 with controller 416.

In the embodiments of FIGS. 3 and 4, image capture devices 324 and 424a-e, and/or an electronically sensitive touch sensing mechanism disposed within touch-sensitive display screen 306, may act as a second communications channel between mobile data storage devices and interactive display device 300. Either of these mechanisms may be capable of communicating with the depicted interactive display devices 300 and 400 in a manner that expresses the position of the devices on the display screen. This enables the interactive display devices 300 and 400 to conduct a locating communication session with a mobile data storage device in which the mobile data storage device sends or receives a specific message across the second communications channel in response to a specific request for that message sent by the interactive display device across the wireless communications channel.

Figure 5:
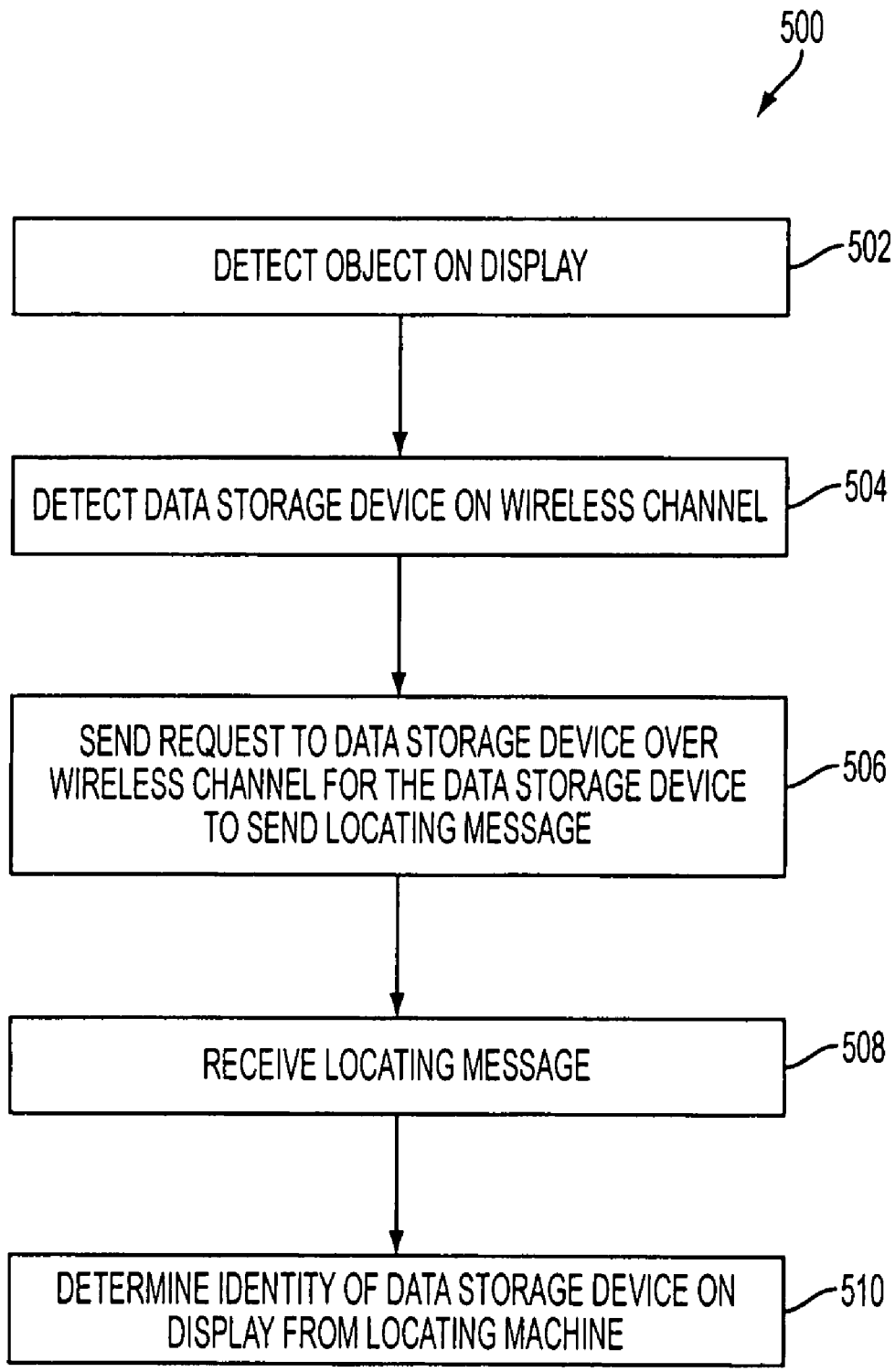
FIG. 5 shows a process flow of another embodiment of a method for identifying a data storage device placed on the surface of an interactive display device.

FIG. 5 shows a process flow depicting another embodiment of a method 500 for identifying one or more data storage device placed on touch-sensitive display screen of an interactive display device. While described herein in the context of interactive display device 400, it will be appreciated that method 500 may be performed by any of the embodiments disclosed herein, including devices 100 and 300, 400, and/or by any other suitable device.

Method 500 first includes detecting, at 502, an object placed on display screen 406, and detecting, at 504, a data storage device on a wireless communications channel via wireless communications transmitter and receiver 422. Next, to determine whether the object detected on display screen 406 is the data storage device detected on the wireless communications channel, interactive display device 400 sends, at 506, a request over the wireless communications channel to the data storage device for the data storage device to send a locating message over the second communications channel.

If the object detected on display screen 406 is the data storage device to which the request was sent, then interactive display device 400 receives, at 508, the locating message. On the other hand, if the object on display screen 406 is not the data storage device detected on the wireless communications channel, then interactive display device 400 will not receive the locating message due to the position-sensitive nature of the second communications channel. In this manner, interactive display device 400 determines, at 510, the identity of a data storage device on the surface of the display screen 406 based on receipt of the locating message. Data may then be downloaded from the data storage device for display on display screen 406.

The locating message sent by the data storage device over the second communications channel may take any suitable form. For example, in some embodiments, the data storage device includes an infrared emitter. Upon receipt of a request to send a locating message, the data storage device emits infrared light via the infrared light emitter. The emitted infrared light may be received by image capture devices 424a-e and detected in the images from image capture devices 424a-e by controller 416. In alternative embodiments, the data storage device includes a second electromagnetic modulator. Upon receipt of a request to send a locating message, the data storage device emits a modulated electromagnetic signal, which may be detected by a suitable detection mechanism associated with display screen 406.

Method 500 may also be used to locate and identify a plurality of mobile data storage devices placed on display screen 406. For example, where four users each place a mobile data storage device on display screen 406, interactive display device 400 may determine which mobile data storage device is located at which position on touch-sensitive display screen by requesting each mobile data storage device to send a locating message that is distinguishable from the locating message sent by the other data storage devices. For example, in some embodiments, the mobile data storage device may be requested to send a locating message at different times. In other embodiments, each mobile data storage device may be asked to send a different locating message, for example, a different number or pattern of emitted signals. In this manner, each mobile data storage device that is detected on interactive display device 400 may be distinguished from other mobile data storage devices located on interactive display device 400, as well as mobile data storage devices that are within wireless detection range but are not located on interactive display device 400.

Further, as described above, image capture device 424a-e may acquire images of display screen 406 at a sufficient frequency to allow the motion of objections on display screen 406 to be tracked. Therefore, once a mobile data storage device has been identified and located on display screen 406, movements of the device on display screen 406 may be tracked, thereby allowing the device to be moved without having to repeat the identification process. If the mobile data storage device is not successfully tracked or is lifted from display screen 406 during movement, the locating process may be again performed to identify and locate the device on display screen 406. Alternatively, interactive display device 400 may be configured to periodically and/or continuously renew device identifications, or to renew identifications whenever a device is moved.

The wireless and second communications mechanisms described above may be implemented in any suitable manner on mobile data storage devices. Some mobile data storage devices may be manufactured with suitable communications mechanisms build into the devices. For example, wireless technologies such as 802.11x and Bluetooth are integrated into many portable data storage devices, including but not limited to cell phones, PDAs, and cameras. Likewise, many portable data storage devices also include infrared data ports. Therefore, such devices may be configured, via software or hardware for example, to conduct a locating communication with interactive display device 400 using standard included equipment. On the other hand, some devices may not include standard equipment that may be used for communicating over the wireless and second communications channels. Therefore, a simple communications tag may be attached to or incorporated into these devices to enable these devices to be located on and identified by interactive display device 400.

Figure 6:
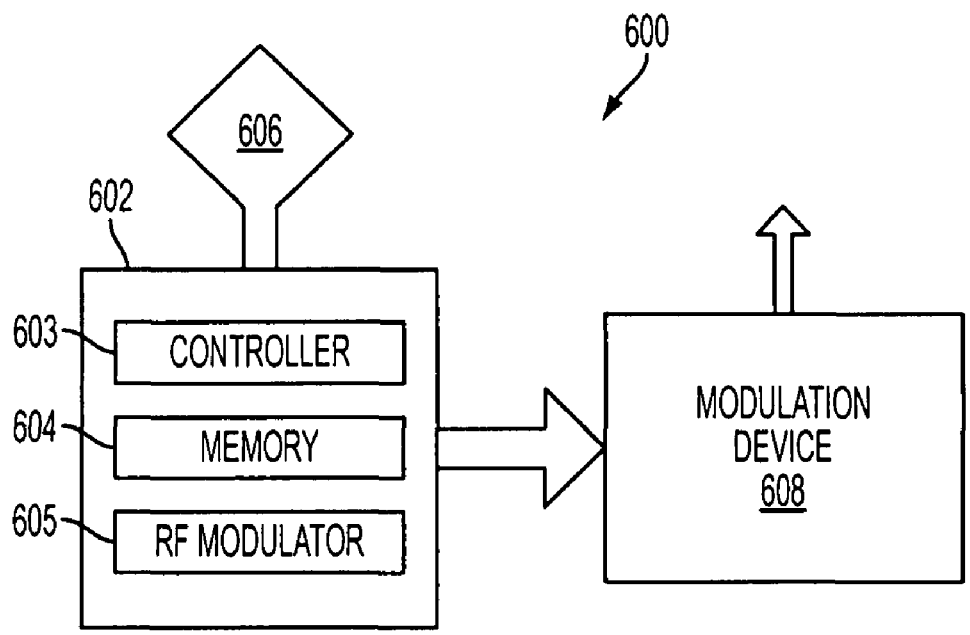
FIG. 6 shows a block diagram of an embodiment of a radiofrequency identification (RFID) tag comprising a secondary communications device.

FIG. 6 shows a block diagram of an embodiment of an identification tag system 600 that may be attached to or incorporated into an object to allow the object to be identified by interactive display device 400. Tag system 600 comprises an RFID tag 602 with a microcontroller 603, memory 604 on which a unique identifier is stored, an RF modulator 605, an RF antenna 606, and a second modulation device 608 configured to emit a modulated electromagnetic or optical signal. Tag system 600 may be read by an RFID interrogator incorporated into wireless transmitter and receiver 422 of interactive display device 400 to transfer a unique identification of the mobile data storage device to interactive display device 400. Further, microcontroller 603 may be configured to cause second modulation device 608 to emit an optical, electrical or electromagnetic locating signal so that interactive display device 400 can locate and identify the device with tag system 600 on touch-sensitive display screen 406. In this manner, tag system 600 may support a large number of unique identification numbers via RFID capabilities (including 128-bit identification numbers), while second modulation device may allow a specific tagged device to be located on display screen 406.

In some embodiments, tag system 600 is electronically passive and acquires all operating power from an interrogating RF field. In alternative embodiments, tag system 600 is electronically active in that it includes a power supply. Where tag system 600 is an active tag, it may include an on-board power supply (i.e. on the tag itself), or may be connected to a power supply on the device on which tag system 600 is included.

Any suitable event may be used to trigger microcontroller 603 to cause second modulation device 608 to send a locating signal at any suitable time. For example, in some embodiments, microcontroller 603 may be configured to receive a request from interactive display device 400 to send the modulating signal, and then may direct second modulation device 608 to emit the signal upon receipt of the request. In alternative embodiments, microcontroller 603 may be configured to alert interactive display device 400, via the RF identification channel, that it will send a specific locating message via second modulator 608, and then may send the locating message after sending the alert. In either case, the locating operation is performed by two-way communication via the wireless communications channel and one-way communication from tag system 600 to interactive display device 400 via the second communications channel.

It will be appreciated that tag system 600 may include both an optical or electrical emitter and an optical or electrical receiver. In these embodiments, tag system 600 and interactive display device 400 may conduct a two-way locating communication in which each device both sends and receives a locating signal. Various embodiments of mobile devices with optical receivers are described in more detail below.

In some embodiments, tag system 600 may be used to transfer more information to interactive display device 400 than a unique identification number. For example, in some embodiments, tag system 600 may be configured to transfer data such as photographic data, video data, etc. for display on interactive display device 400 via the RFID communications channel.

Further, it will be appreciated that tag system 600 may have applicability beyond identifying a mobile data storage device on touch-sensitive display screen 400. For example, tag system 600 may be placed on any desired object to allow interactive display device to identify and interact with that object. As one example, tag system 600 may be included on a card issued to and linked specifically to a guest at a resort, amusement park, or other such entertainment facility. While the user is at the entertainment facility, photographs may be taken of the guest performing various activities, such as riding rides, participating in sports activities, etc., and may be displayed at a kiosk to the user for selection after the activity has included. As a specific example, a roller coaster may include a camera configured to photograph all of the riders as the roller coaster cars pass by the camera.

Upon conclusion of the ride, a rider may view the photographs at a kiosk, scan the card to alert the kiosk of the identity of the person making the selection, and then select photographs in which the rider and/or the rider's friends and/or family appear. Then, at a later time and/or different location, for example, in a hotel lobby, or in a coffee house or restaurant affiliated with the resort, the rider may place the card on the surface of an interactive display device 400. The device may determine the identity of the holder of the card by receiving the unique ID of the card holder via RFID tag 602, query a database to determine those photos previously selected by the rider, and then download those photos for display on display screen 406.

Figure 7:
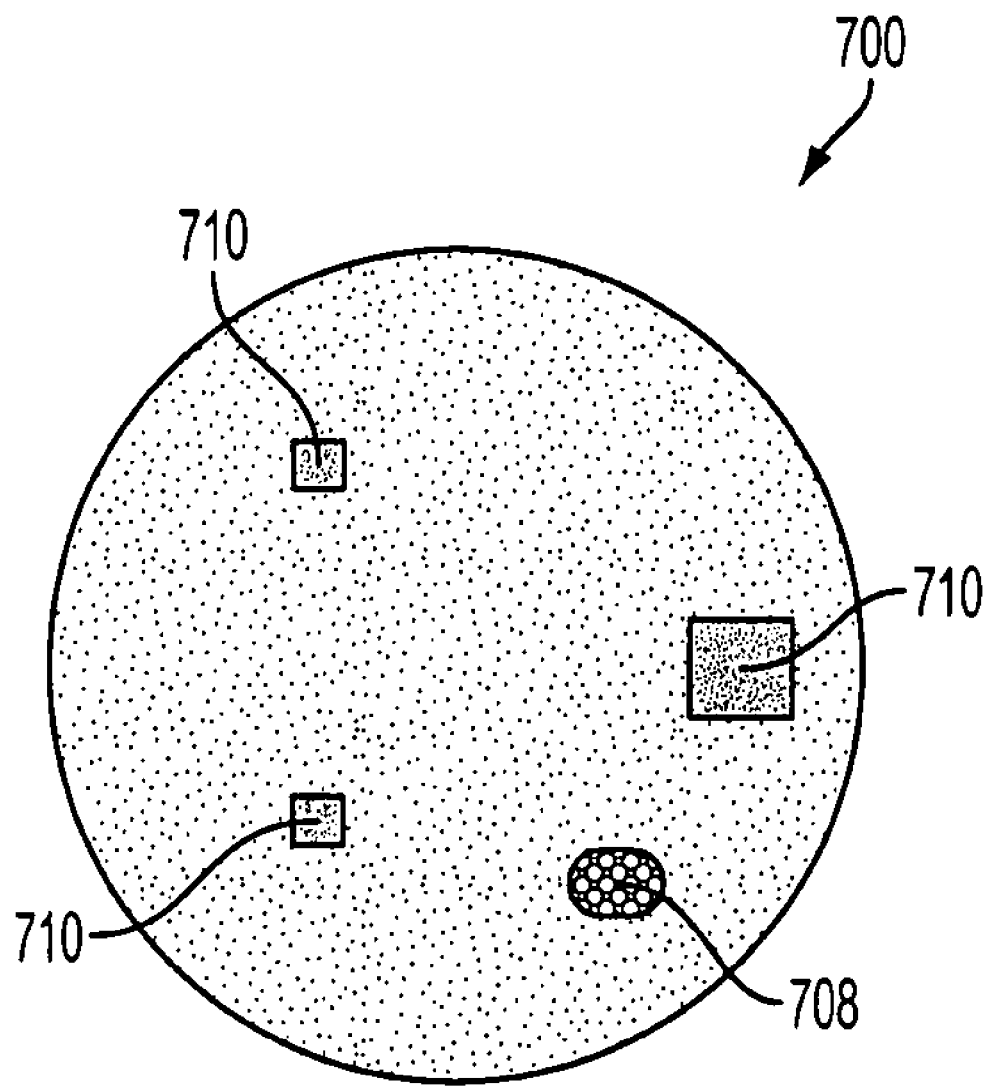
FIG. 7 shows a block diagram of an alternative embodiment of an RFID tag comprising a secondary communications device.

Furthermore, where multiple cards are placed on the table, interactive display device 400 may determine where each detected card is located on display screen 406 via second modulator 608, and then display the downloaded photos in locations and orientations based upon the location of the cards on the table. It will be appreciated that tag system 600 may be used to allow interactive display device 400 to uniquely identify any other suitable object, such as drinks, glasses or plates placed on display screen 406 for enabling drink or food ordering through touch-sensitive display screen 400, etc. Further, other indication indicia may be included on tag system 600 (or elsewhere on an object) to allow an orientation of an object to be determined. FIG. 7 shows a schematic depiction of a tag system 700 having a second modulator 708, and a plurality of other optical indicators 710. For example, the relative locations of the signal from second modulator 708 and the detected positions of other optical indicators 710 may be detected by interactive display device 400. The orientation of the object may then be determined by comparing the positions of second modulator 708 and other optical indicators 710 to a database containing information on the location of optical indicators on tags.

Optical indicators 710 may also serve to identify the device on which tag system 700 is located as one including a second optical or electrical communications channel. This allows the display device to ignore objects that do not possess such a communications channel. Further, optical indicators 710 also may be used to locate the secondary communications channel on large and/or complex devices, so the display surface does not have to know the location of the secondary communications channel for all present and future devices. Additionally, optical indicators 710 can act as a visual cue to a user in that the optical indicators may indicate to the user which surface of the object, such as a surface having a camera lens, should be placed in contact with the display surface.

Additionally, optical indicators 710 may simplify the tracking of devices moved on the display surface. For example, once the identity of a device has been determined and associated with the optical indicators 710 located on that device, the device may be identified at any location on the display surface simply by reading optical indicators 710. Further, changes in the orientation of tag system 700 may be detected by tracking the changes in the positions of optical indicators 710 and/or second modulator 708. This may allow the rotation of an object including tag system 600 on display screen 406 to be used as an input to interactive display device 400. Such an input could be used, for example, to trigger a change in a displayed image, to cause a scrolling menu displayed on touch-sensitive display screen to scroll, or to trigger any other desired functionality in interactive display device 400.

Any suitable optically readable symbol or arrangement of symbols may be used as optical indicators 710. For example, in one embodiment, optical indicators 710 may take the form of a barcode. In alternative embodiments, optical indicators 710 may comprise optically reflecting or absorbing shapes such as circles, triangles, rectangles, etc. Different sizes and/or arrangements of shapes may be used to identify various objects. Furthermore, in other alternative embodiments, more than one second modulator 708 may be provided, thereby allowing tag orientation and/or object orientation to be determined via the signals from the plurality of second modulators.

Depending upon the configuration of optical indicators 710, optical indicators 710 may provide sufficient bit depth to be able to uniquely identify objects within a selected environment, and may thereby be able to represent both an identity and a location of an object placed on interactive display device 400. This may allow for the unique identification of an object via an optically reflective passive tag, without the use of any RFID or optical emitters located on the tag. For example, upon reading such an optically reflective passive tag, interactive display device 400 may query a database containing records linking each unique optical tag pattern to a specific device and/or device owner to determine the device and/or owner linked to that specific tag. In this manner, interactive display device 400 may uniquely identify a device detected on display screen 406 from the passive tag alone, without any optical or electrical signal emitted by the tag.

Figure 8:
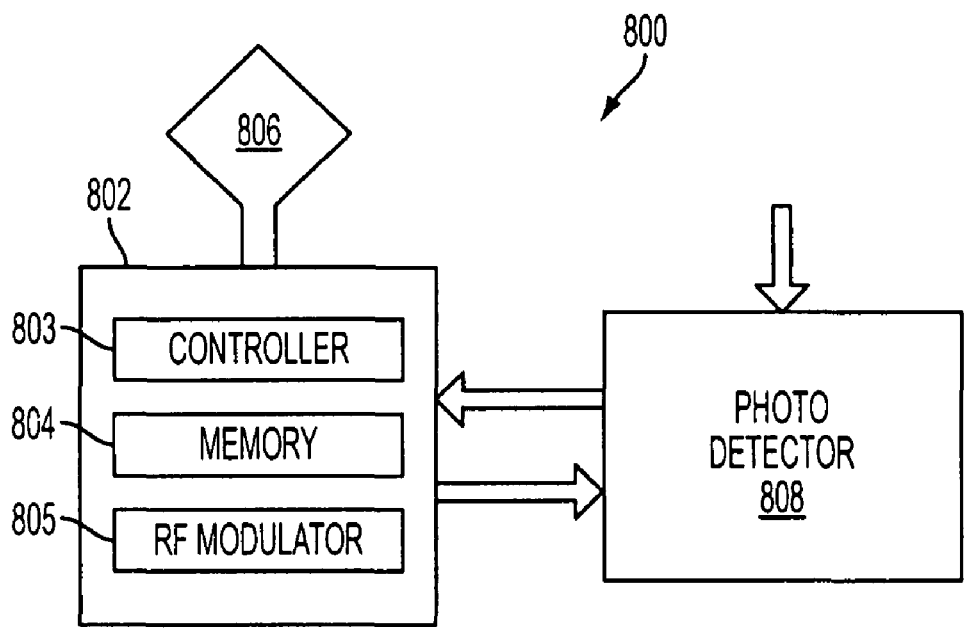
FIG. 8 shows a schematic depiction of another embodiment of an RFID tag comprising an optical emitter and a plurality of other optically readable elements.

An identification tag may also be configured to receive a locating signal from interactive display device 400 via a second communications channel. FIG. 8 shows a block diagram of another embodiment of an identification tag system 800 configured to receive a locating signal sent by interactive display device 400. Tag system 800 comprises an RFID tag 802 with a microcontroller 803, memory 804 on which a unique identifier is stored, an RF modulator 805, an RF antenna 806, and an optical detector 808 configured to detect an optical signal emitted by interactive display device 400. As described above for tag system 600, tag system 800 may be a passive device powered by an interrogating field, or may be an active device with an on-board power supply.

Any suitable optically sensitive structure may be used as optical detector 808, and optical detector 808 may be configured to receive any suitable optical signal from interactive display device 400. For example, in some embodiments, optical detector 808 may comprise a simple color-sensitive or light-sensitive detector. In these embodiments, interactive display device 400 may be configured to display a selected color on display screen 406 in a location adjacent to tag system 800, to request tag system 800 to acquire an optical data sample from optical detector 808, and then to send the optical data sample to interactive display device 400 via RFID tag 802 and antenna 806 (or via another wireless communications channel). Interactive display device 400 may then compare the optical sample to the color displayed on display screen 406 to determine the presence and location of tag system 800 on display screen 406. Alternatively, interactive display device 400 may modulate a color or shades of color displayed on display screen 406, and receive an optical sample of the modulated color from tag system 800.

Some mobile data storage devices may include an optical detector built into the device. For example, many cell phones and PDAs include cameras configured to capture photographic images and/or video segments. Therefore, such a device may include programming that allows the devices to connect wirelessly to interactive display device 400, and to receive a locating communication from interactive display device 400 via the use of the on-board camera as a second communications channel.

Figure 9:
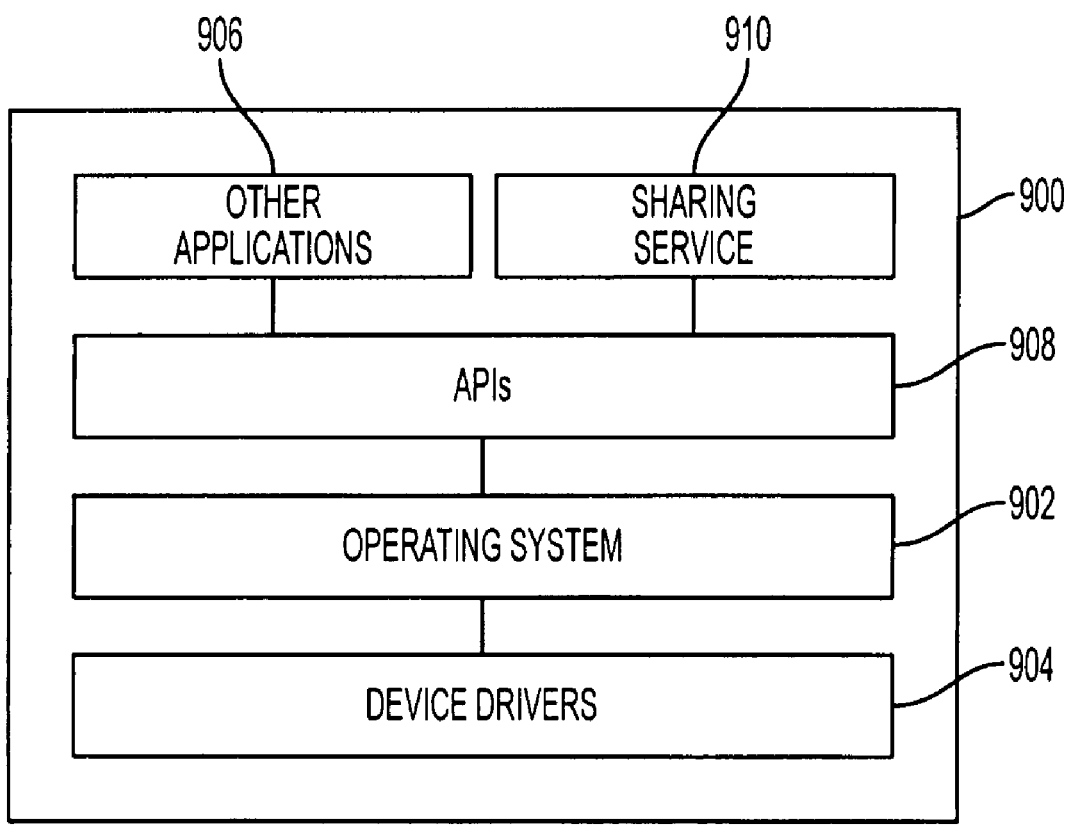
FIG. 9 shows a block diagram of an embodiment of a software architecture of a mobile data storage device.

FIG. 9 shows a block software architecture diagram 900 of an example mobile data storage device, such as a cell phone. Software architecture 900 includes an operating system 902, device drivers 904 which allow the operating system to interact with the hardware components of the mobile device, and applications 906 which interact with operating system 902 via application programming interfaces 908.

Further, software architecture 900 includes a sharing service 910 that allows the mobile data storage device to transfer data to and/or from interactive display device 400. Sharing service 910 also may be configured to communicate with interactive display device 400 via a camera or other optical detector on the mobile data storage device.

Figure 10:
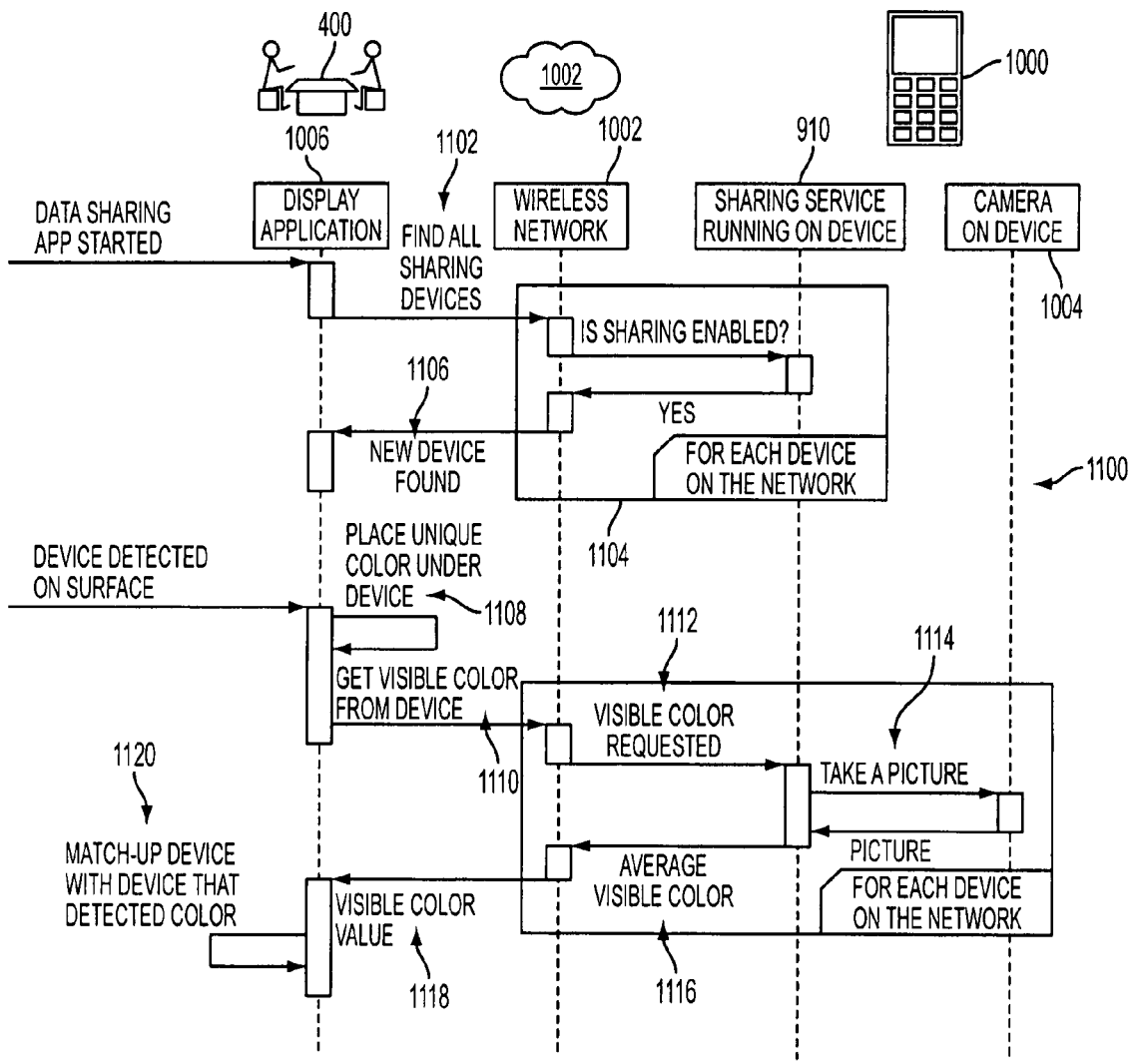
FIG. 10 shows a process flow of another embodiment of a method for identifying a data storage device placed on the surface of an interactive display device.

FIG. 10 shows a process flow of an embodiment of a method 1100 for identifying a mobile data storage device 1000 detected on a wireless network 1002 and placed on the surface of an interactive display device 400 via a camera 1004 provided on mobile data storage device 1000. Processes performed by interactive display device applications 1006 are shown in a left-most portion of FIG. 10; communications between interactive display device applications 1006 and sharing service via wireless network 1002 are shown in a left-center portion of FIG. 10; processes performed by sharing service 910 running on device 1000 are shown in a right-center portion of FIG. 10; and processes performed by camera 1004 are shown in a right-most portion of FIG. 10.

Method 1100 begins at 1102 with the interactive display device application 1006 finding all mobile data storage devices enabled to share data with interactive display device 400. Application 1006 may find these devices by periodically sending a beacon over wireless network 1002, or by sending a beacon over wireless network 1002 when an object is detected on interactive display device 400. Next, as indicated at 1104, if sharing service 910 is enabled on a mobile device detecting the beacon, the mobile device returns a message to display application at 1106 alerting the display application of its presence. Processes 1102-1106 are performed for each mobile data storage device that receives the beacon and that has its sharing service enabled.

Next, at each detected object on the display screen 406, interactive display device may display a unique color or image beneath the object, as indicated at 1108. Next, as indicated at 1110, display application 1006 may direct each mobile data storage device detected on wireless network 1002 to send a locating message by capturing an image and sending a message related to the captured image to the display application 1006.

Upon receipt of this instruction, sharing service 910 on each mobile data storage device directs camera 1004 on that device to collect an optical sample by taking a picture, as indicated at 1112. Next, as shown at 1114, camera 1004 then takes the picture and returns the picture to sharing service 910. In some embodiments, sharing service 910 may perform some processing of the optical sample or may acquire data from the optical sample, such as an average of the colors in the image, as shown at 1116.

Next, sharing service 910 sends the image, data acquired from the image, or another such locating message related to the image, back to display application 1006 over wireless network 1002, as shown at 1118. Finally, as indicated at 1120, display application 1006 can then match the image (or data acquired from the image) to the image that was displayed under the detected object to determine which, if any, of the mobile data storage devices detected on wireless network 1002 corresponds to the detected object. Where more than one object is detected on interactive display device 400, method 1100 may also be used to identify and locate each mobile data storage device that is placed on interactive device and distinguish those devices from other objects detected on interactive display device 400.

In some embodiments, interactive display device 400 may display a timed sequence of colors under the detected object, rather than a single color. As another alternative, interactive display device 400 may be configured to modulate the output from LEDs 326 and/or 426, and mobile data storage device 1000 may detect the modulated LED output with camera 1004. Furthermore, display application 1006 may use different techniques for choosing and displaying the color beneath the device to determine if a color works best for a selected device. Additionally, sharing service 910 may be configured to process the image acquired by camera 1004 to facilitate the identification of the color displayed beneath it. For example, such processing may include, but is not limited to, ignoring blown highlights, ignoring areas with no color, or clamping the color values to a specific set of colors. Likewise, sharing service 910 may be configured to return an error message or no response if camera 1004 is unable to see a uniform enough color. Additionally, in some embodiments, a user may be provided with the option of disabling the secondary communications channel to prevent unauthorized or unintentional communication with the interactive display device. This may provide a user with more control over whether content from the user's device is downloaded to the interactive display device. Furthermore, while the above-described embodiments utilize automatic location and identification processes to create a smooth user experience, it will be appreciated that either a portable data storage device and/or an interactive display device may be configured to require acknowledgement and/or confirmation from a user before initiating a transfer of data to the interactive display device. For example, a portable data storage device with a passive tag, with or without a secondary communications channel, may be configured to transmit a "confirm" signal to the display device over a radio frequency communications channel. This "confirm" signal may be generated in response to a specific device action by the user (i.e. pressing a specific button) in response to a prompt by the display device (i.e. "Press confirm to transmit your pictures"). In this manner, data from a user's device would be transferred to the interactive display device only upon specific authorization by the user.

It will be appreciated that the configurations and/or approaches described herein are exemplary in nature, and that these specific embodiments or examples are not to be considered in a limiting sense, because numerous variations are possible. For example, while described herein in the context of an interactive display device having a horizontal, table-like display surface, it will be appreciated that the concepts described herein may also be used with displays of any other suitable orientation, including vertically arranged displays. Additionally, a portable data storage device may include more than one secondary communications device. For example, a device may include a passive optically readable tag, an active optical or electromagnetic secondary communications channel, and/or an on-board camera.

Furthermore, the specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the exemplary embodiments described herein, but is provided for ease of illustration and description.

The subject matter of the present disclosure includes all novel and no obvious combinations and sub combinations of the various processes, systems and configurations, and other features, functions, acts, and/or properties disclosed herein, as well as any and all equivalents thereof.

The invention claimed is:

1. In an interactive display device comprising a touch-sensitive surface, a method of identifying a data storage device placed on the touch-sensitive surface, the method comprising:
   detecting a presence and location of an object including the data storage device on the surface of the display device;
   detecting a plurality of data storage devices on a wireless communications channel, the plurality of data storage devices including the data storage device included with the object on the surface of the display device;
   distinguishing the object comprising the data storage device placed on the display and detected via the wireless communications system from one or more data storage devices not placed in the display but detected via the wireless communications channel by sending a request to each data storage device detected over the wireless communications channel for the data storage device to emit or receive a locating signal over a second communications channel, and communicating with the object detected on the surface of the display over the second communications channel;
   after distinguishing which data storage device detected on the wireless communications channel is included with the object detected on the surface of the display device, receiving data from the data storage device included with the object detected on the surface of the display via the wireless communications channel; and
   displaying on the display device the data received from the data storage device.

2. The method of claim 1, wherein the wireless communications channel comprises a radiofrequency communications channel, and wherein the second communications channel comprises an infrared or visible optical communications channel.

3. The method of claim 2, wherein communicating with the data storage device included with the object detected on the surface of the display over the optical communications channel comprises sending a request to each data storage device over the wireless communications channel for that data storage device to emit an optical locating message, and then detecting the optical locating message from the object located on the surface of the display.

4. The method of claim 3, wherein the optical locating message is detected via an image capture device disposed within the display device.

5. The method of claim 3, further comprising reading one or more passive optical elements disposed on the object located on the surface of the display and determining an orientation of the object located on the surface of the display device from the relative positions of the one or more passive optical elements and/or the detected optical locating message.

6. The method of claim 2, wherein communicating with the data storage device included with the object located on the surface of the display over the optical communications channel comprises modulating an optical emitter within the display device and receiving a locating message from the object located on the surface of the display confirming receipt of a signal from modulation of the optical emitter.

7. The method of claim 2, wherein displaying on the display device the data received from the data storage device included with the object located on the surface of the display comprises displaying the data at a location associated with the object located on the surface of the display.

8. The method of claim 1, wherein the second communications channel is an electromagnetic communications channel, and wherein communicating with the data storage device included with the object located on the surface of the display over the second communications channel comprises sending a request over the wireless communications channel to the data storage device included with the object located on the surface of the display requesting the data storage device included with the object located on the surface of the display to emit an electromagnetic locating message, and receiving the electromagnetic locating message.

9. The method of claim 1, wherein sending a request to each data storage device detected over the wireless communications channel for the data storage device to emit or receive a locating signal over a second communications channel comprises displaying a locating message image on a portion of the touch-sensitive surface adjacent to the object located on the surface of the display, and sending a request over the wireless communications channel to each data storage device detected on the wireless communications channel to capture an optical data sample via a photodetector on the data storage device and to transfer the optical data sample to the display device over the wireless communications channel.

10. The method of claim 8, wherein the second communications channel is an RFID communications channel.

11. An interactive data transfer and display device, comprising:
- a touch-sensitive display system comprising a display, a touch-sensitive mechanism configured to detect objects on the display, and an optical source;
- a wireless communications system;
- a processor in electrical communication with the display system and the wireless communications system; and
- memory comprising machine-readable instructions executable by the processor:
  - to detect locations of objects placed on display via the touch-sensitive mechanism,
  - to detect one or more data storage devices within wireless communication range via the wireless communications system,
  - to distinguish an object comprising a data storage device placed on the display and detected via the wireless communications system from one or more other data storage devices not placed on the display but detected via the wireless communications system by sending a request to each data storage device detected via the wireless communications system to send or receive a locating message over an optical communications channel and detecting the locating message sent from or received by the object comprising the data storage device placed on the display,
  - to receive via the wireless communications system data from the data storage device of the object placed on the display, and
  - to display on the display device the data received from the data storage device of the object placed on the display.

12. The display device of claim 11, wherein the touch-sensitive mechanism comprises an image capture device configured to capture an image of the display.

13. The display device of claim 12, wherein displaying the data received from the data storage device of the object placed on the display device includes displaying the data on the display in a location and orientation that is associated with the object placed on the display.

14. The display device of claim 11, wherein the optical source comprises an infrared emitter, and wherein the instructions are executable by the processor to modulate infrared light emitted by the infrared emitter; to send a request via the wireless communications system to each data storage device detected via the wireless communications system to detect the modulated infrared light via a photodetector on the data storage device; and to receive a response to the request from the data storage device of the object placed on the display.

15. The display device of claim 11, wherein the optical source comprises a visible light source and an image producing element, and wherein the instructions are executable by the processor to send the request to each data storage device detected via the wireless communication system to send or receive a locating message over the optical communications channel by
- displaying an image on the display under the object placed on the display; and
- sending a request via the wireless communications system to all data storage devices detected via the wireless communications system to capture an optical data sample via a photodetector and to transfer the optical data sample to the display device.

16. The display device of claim 11, wherein the touch-sensitive mechanism comprises an image capture device, and wherein the processor is configured to read a passive tag disposed on the data storage device with the image capture device, to display on the display a request for a user to send a confirmation message, and to receive the confirmation message via the wireless communications system.

* * * * *